Oct. 6, 1931.  A. STUBER  1,826,680
MOTION PICTURE PROJECTOR CABINET
Filed Sept. 2, 1927   3 Sheets-Sheet 1
FIG_1_
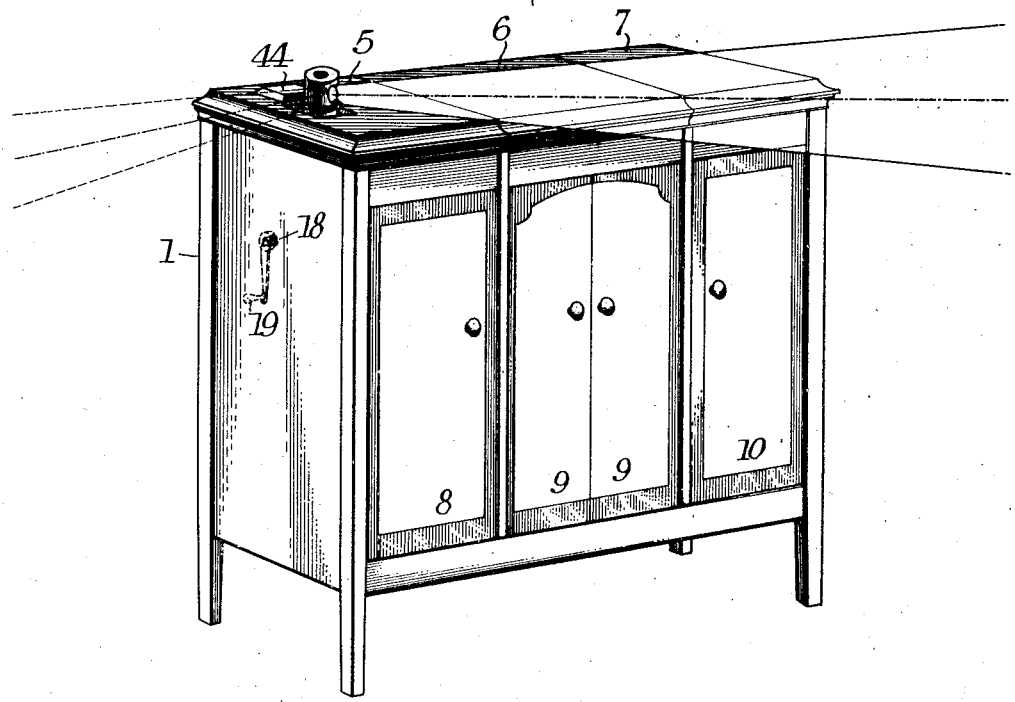
FIG_2_
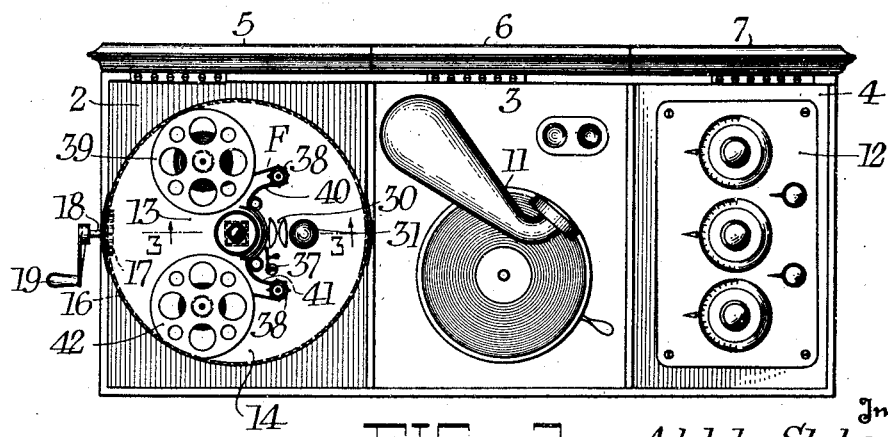
Inventor,
Adolph Stuber,
R. L. Stinchfield
N. M. Perrins
By
Attorneys Oct. 6, 1931. A. STUBER 1,826,680
MOTION PICTURE PROJECTOR CABINET
Filed Sept. 2, 1927 3 Sheets-Sheet 2
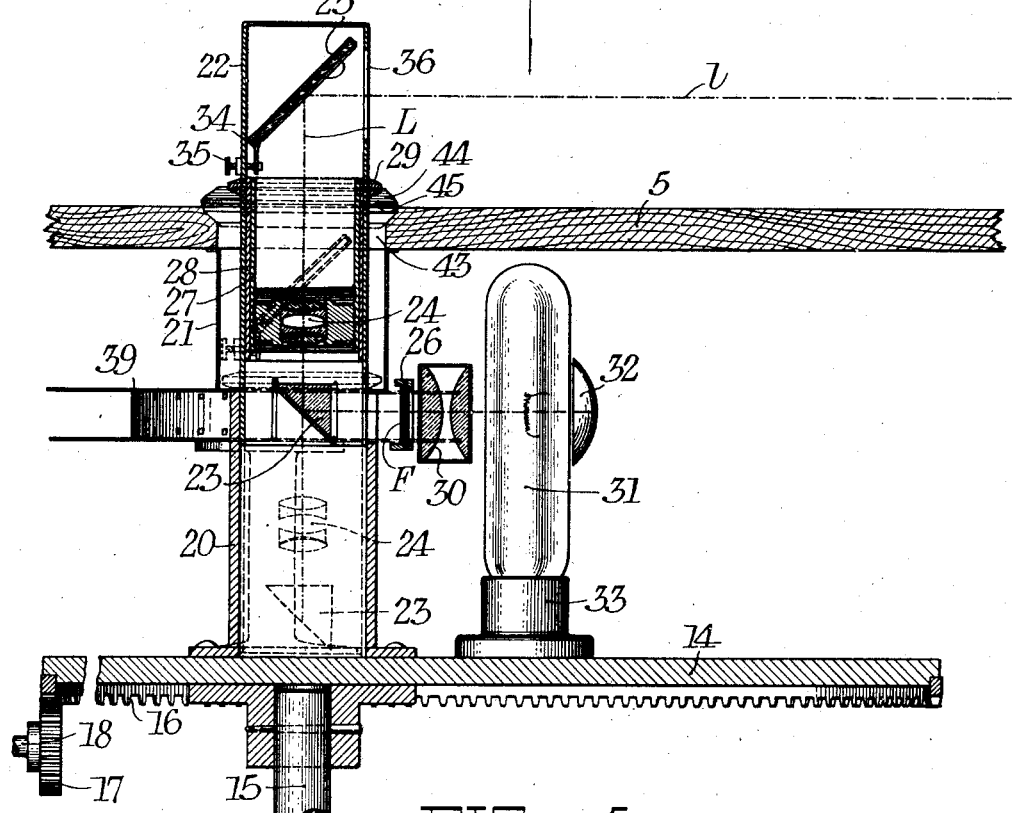
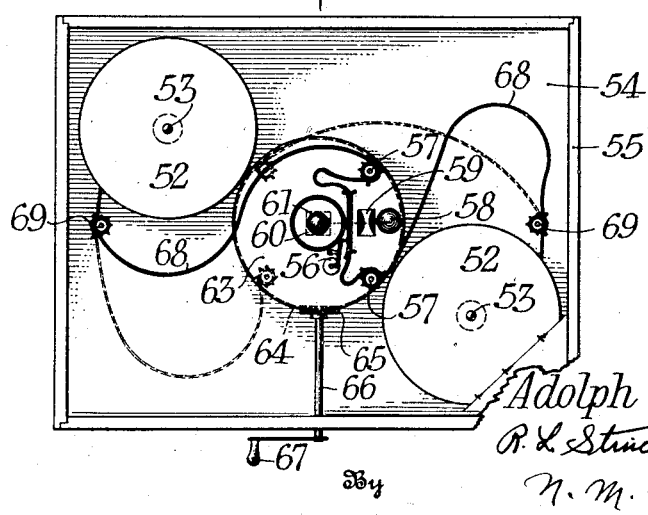
Inventor,
Adolph Stuber,

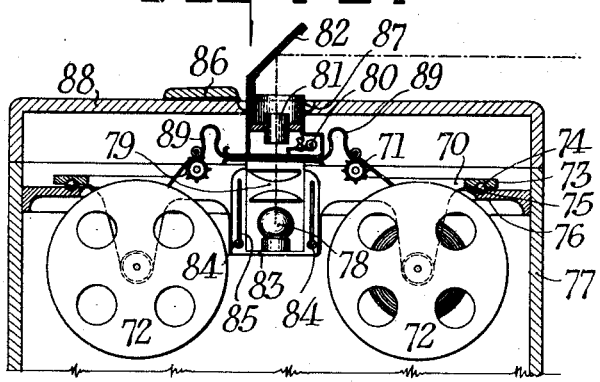

Patented Oct. 6, 1931

1,826,680

UNITED STATES PATENT OFFICE

ADOLPH STUBER, OF ROCHESTER, NEW YORK, ASSIGNOR TO EASTMAN KODAK COMPANY, OF ROCHESTER, NEW YORK, A CORPORATION OF NEW YORK

MOTION PICTURE PROJECTOR CABINET

Application filed September 2, 1927. Serial No. 217,166.

This invention relates to motion picture projectors and particularly to a projector housed with a sound reproducing instrument in a common cabinet.

While there have been numerous suggestions that a motion picture projector and a phonograph be housed in a common housing, the structures of this type have been very limited in their usefulness. It has been generally considered necessary to mount a small screen on the cabinet and project a picture upon this. This has limited the picture to one of very small area, not sufficiently large to be properly seen from all points of a large room. Moreover, all such projectors have been limited to a single exhibiting space. It has not been possible, without movement of the bulky piece of furniture, to change the position of the projection screen.

I have overcome these objections by mounting the projector as a whole on a rotatable support in a cabinet, and projecting a picture in any desired direction to the most suitable location for a portable screen. It is then possible to place the cabinet, as an article of furniture, in an unobtrusive position, as may be most convenient with respect to the other furniture and the architectural features of the room, and to project the beam in any desired direction without movement of the cabinet to a screen in such a position as best suits the spectators.

Furthermore, I include with this freedom of position for the screen certain structural features adapting the projector cabinet particularly for use with a phonograph or radio apparatus. There is unavoidably a certain amount of noise attendant upon the operation of a motion picture projector and this is decidedly objectionable when accompanying music is being rendered. I have overcome this objection by entirely enclosing the projector and its mechanism, and projecting the beam through a window or opening in the cabinet that permits the projection beam to pass but muffles or encloses the sound. This is done preferably by mounting one of the parts of the optical system in this window, providing a structure that permits the beam to be swung freely as the projector is turned.

It is furthermore necessary to mount the instrument and the movable parts accessory to it in such a way that they will not interfere with the projected beam.

Other objects and advantages of my invention will appear from the following description wherein reference is made to the accompanying drawings in the several figures of which the same reference characters denote the same parts throughout, and in which Fig. 1 is a perspective view, showing a cabinet equipped with a motion picture projector constructed in accordance with and illustrating a preferred embodiment of my invention;

Fig. 2 is a top plan view of the apparatus shown in Fig. 1 with all the covers in a raised position;

Fig. 3 is a fragmentary detail section through a portion of the mechanism shown in Fig. 2, being a section taken on line 3—3 of Fig. 2, the cover being closed;

Fig. 4 is a top plan view of a second embodiment of my invention, parts being omitted for the sake of clearness;

Fig. 5 is a vertical section of a third embodiment of my invention;

Fig. 6 is a similar view of a fourth embodiment of my invention;

Fig. 7 is a top plan view of still another embodiment of my invention;

Fig. 8 is a section on line 8—8 of Fig. 7.

As shown in the first three figures, a preferred embodiment of my invention may consist of a cabinet 1 provided with a series of compartments 2, 3, and 4. Each of these compartments may have separate covers 5, 6, and 7 and separate doors 8, 9, and 10 which permit access to at least one side of the apparatus contained in the compartments. Sections 3 and 4 may contain sound reproducing instruments such as a phonograph shown diagrammatically at 11 and a radio apparatus shown diagrammatically at 12. Section 2 in accordance with my invention is provided with a motion picture projecting mechanism designated broadly as 13, this machine being adapted to project a beam of light in any direction with respect to the cabinet 1.

In the present form the beam of light may be controlled by turning the entire motion picture machine 13 upon a supporting table 14 which may be rotated (see Fig. 3) upon a shaft 15 by means of the gear 16, pinion 17, shaft 18, and handle 19.

Referring particularly to Fig. 3 the turntable 14 is preferably provided with an upwardly extending support 20 which supports a second tubular member 21 inside of which a tubular housing 22 is slidably mounted, the outside of housing 22 contacting with and being fastened upon the inside of tube 20. Housing 22 supports a prism 23, an objective 24, and a reflector 25, this optical system being adapted to project, from a film F located in the film gate 26, an image along the path designated by the heavy dot and dash line L.

I prefer to move the objective 24 in a tube 27, which, with tube 28 and housing 22 forms a focusing mount of a well known type which may be adjusted by a knurled ring 29. This apparatus permits the image to be properly focused on the screen. Condensers 30 concentrate the light beam from lamp 31 and reflector 32 upon the film gate. The lamp 31 is carried in a socket 33 supported on the turntable 14.

A reflector is preferably pivoted at 34 so that it may be angularly adjusted by means of the screw 35, this construction being useful to vary the angle of the light beam normally passing out horizontally to a projection screen mounted at any desired distant point. This screen may be higher than the reflector in which case the reflector 25 may be correspondingly tilted so that the picture will be centered upon the screen. Where I refer in the specification and claims to the horizontal beam I refer to the light beam the axis of which is indicated by the dot and dash line $l$ which is substantially horizontal, but which may be inclined somewhat from a horizontal direction for the reason above described.

It should be noted that the pulldown mechanism indicated diagrammatically in Fig. 2 at 37 together with the sprockets 38 are located outside of the tubular housing formed by members 20 and 21. These members form a substantially sound-proof connection between the turntable 14 and the cover section 5 which normally encloses a motion picture projector in section 2 of the cabinet 1.

As also shown in Fig. 2 the film F may be wound from a supply reel 39 upon a sprocket 38 which feeds film to a loop 40 from which the pulldown 37 intermittently moves the film to a second loop after which the film passes over sprocket 38 to the takeup reel 42. Since the particular type of motion picture projector forms no part of the present invention, I have shown only such parts as are necessary for an understanding of the invention.

Referring to Fig. 3 the cabinet cover 5 is provided with an opening 43 which may be covered by a door 44 hinged at 45 when the housing 22 has been moved downwardly so that the parts lie beneath the cover 5 in the position indicated by broken lines. As will be readily seen when the motion picture projector is not in use, it is entirely enclosed in the cabinet section 2. One feature of my invention is the enclosing of the working parts of the motion picture projector in such a manner that the noise will be greatly reduced if not entirely eliminated, so as not to interfere with the sounds from a sound reproducing instrument.

In the first described embodiment of my invention the entire motion picture projector 13 was movably mounted. In the second embodiment diagrammatically shown in Fig. 4 the film reels 52 may be mounted upon supports 53 fixed in position on the partition 54 of the cabinet 55. The film moving mechanism including the pulldown 56, and sprockets 57 together with the optical system including the lamp 58, condenser 59, reflector 60, and objective 61 may be mounted upon a relatively small turntable 63, and this table may include a gear 64 meshing with pinion 65 on shaft 66 which may be turned by a handle 67 to adjust the angle of the projected picture. The axis of rotation passes through the objective 61, and as the table 63 is turned by the handle 67 the size and shape of the film loop 68 is altered between the sprockets 57 and the relatively fixed sprockets 69 which are driven by suitable mechanism at the same speed. The relative position of the film loops is indicated by full and broken lines. It is to be understood that this form is otherwise similar to the form first described.

This type of projector has certain advantages in that a relatively small turntable may be used.

In the embodiment of my invention shown in Fig. 5 the reels 72 are mounted in a vertical instead of a horizontal position, and the entire projector mechanism 71 is mounted upon a table 70 including an annular plate 73 having a race 74 for ball bearings 75 which also rotate in an annular plate 76 supported upon the cabinet walls 77. The projection lamp 78, condensers 79, pulldown mechanism 80, objective 81, and reflector 82 are all mounted upon a slide 83 which may move on pins 84 which pass through slots 85. Thus the mechanism above described may be moved downwardly so that the door 86 may close the opening 87 in the top 88 of the cabinet, or this mechanism may be moved up into the operative position shown in Fig. 5. When in the inoperative position the film loops 89 are of sufficient length to permit the upward movement of the slide.

In this form, like those previously described, there is a substantially sound-proof connection between the tubular member 90 and the door 87 so that the noise of the mechanism enclosed in the cabinet section is so muffled as to be unobtrusive.

In Fig. 6 the construction shown is a modification of that shown in Fig. 5. The projector 90 is mounted with the reels in substantially vertical alignment. The horizontal objective 91 projects a beam through reflecting prism 92 vertically to reflector 93 which directs it in a substantially horizontal direction through window 94 of the tubular member 95 which is carried by and may be slid down into the tubular housing 96. This construction provides a sound-tight exit for the light beam. The projector 90 is mounted upon a table 97 which may move upon a central post 98, and which is preferably provided with a counter-balancing weight 99 opposite the projector 4. In this form as in those previously described, the axis of rotation is coincident with a vertical portion of the axis of the projection beam.

In Figs. 7 and 8 the cabinet section 2 may be provided with a turntable 100 which turns upon a post 101 which is not in line with the optical axis of objective 102. This table carries a lamp 103, condensers 104, pulldown 105, and film gate 106, the film F being moved by the pulldown and by sprockets 107 from the supply reel 108 to the takeup reel 109. The table may be adjusted upon an annular plate 110 having arcuate grooves 111 through which bolts 112 may pass. Wing nuts 113 are provided so that the table 100 may be fastened in an adjusted position. This is sometimes useful since after once being set the machine may be used without further attention by merely opening the top 114 which is pivoted at 115 to the rear wall 116 of the cabinet. This permits only limited angular adjustment.

In the last described embodiment of my invention it is not necessary to have an opening through which the light beam may pass other than the cover 114 of the cabinet. While this has certain advantages it limits the useful angle through which a light beam may be directed, and also does not have an advantage shown in the other forms for greatly reducing the noise of the machine by enclosing the working parts.

It is to be noted that in all of the above described forms, the instruments are completely enclosed when not in use, in an ornamental cabinet which may be permanently located, as an article of furniture, in an obtrusive position. When desired, it may be used by positioning any suitable projection screen, at the most convenient position and directing the projection beam toward it. It is further to be noted that, in ordinary use, the radio or phonograph apparatus may be started and the cover closed, and these will not interfere with the projected beam. The side doors 9 and 10 permit the issuance of sound in a customary way. With the cabinet backed against a wall, the covers 6 and 7 when fully open will not interfere with the beam. In any event, the cabinet is so designed as to be particularly useful for the combined use of a motion picture projector and a sound reproducing instrument, the noise of the former not interfering with the latter and the latter and its accessory parts not interfering with the former.

In the accompanying drawings it is to be understood that the structural details of the motion picture projector, the phonograph, and the radio apparatus are not given since they are not necessary to an understanding of the present invention; but that mechanisms of well known type may be used, and that the projector and phonograph are, as is now common, driven from electric motors or from a common electric motor.

It is obvious that numerous embodiments of my invention are possible, and I contemplate as included therein all such modifications and equivalents as fall within the scope of the appended claims.

Having thus described my invention, what I claim as new and desire to secure by Letters Patent is,—

1. In combination, a frame, a support pivotally mounted on said frame on a vertical axis, a motion picture projector carried by said support and operative to project motion pictures at any desired angular position of said support and including a projection gate and an optical system for projecting a beam horizontally, a cabinet enclosing said support and projector, parts of said cabinet being movable to permit the emergence of light from said cabinet and to permit said optical system to throw a horizontal beam from the cabinet, whereby the direction of said beam may be adjusted by angular movement of the support.

2. In combination, a frame, a cabinet, a pivotally mounted support within said cabinet, a motion picture projector carried by said support and operative to project motion pictures at any desired angular position of said support and including a projection gate and an optical system for projecting a beam of light from said gate, the cabinet having a movable door and completely enclosing the projector when the door is closed and, when said door is open, permitting the passage of a beam of light from said optical system for projection on a distant screen, the optical system and projector being adjustable by the angular movement of the support whereby the position of the screen may be varied with respect to the cabinet.

3. In combination, a frame, a cabinet, a pivotally mounted support within said cabinet, a motion picture projector carried by said support and operative to project motion pictures at any desired angular position of said support and including a projection gate and an optical system for projecting a beam of light from said gate, the cabinet having a movable door and completely enclosing the projector when the door is closed and, when said door is open, permitting the passage of a beam of light from said optical system for projection on a distant screen, means for closing the cabinet to the passage of sound waves when the door is open, the optical system and projector being adjustable by the angular movement of the support whereby the position of the screen may be varied with respect to the cabinet.

4. In combination, a frame, a support pivotally mounted on said frame on a vertical axis, a motion picture projector carried by said support and including a projection gate and an optical system, the optical system including elements for directing a beam vertically from the gate and a reflector for directing the beam horizontally, a cabinet entirely enclosing said support and projector, a part of said cabinet being movable to open said cabinet and permit said optical system to project horizontally a motion picture from said gate, the direction of said beam being adjustable by angular movement of the support.

5. In combination, a frame, a support pivotally mounted on said frame on a vertical axis, a motion picture projector carried by said support and including a projection gate and an optical system, the optical system including elements for directing a beam vertically from the gate and a reflector for directing the beam horizontally, a cabinet entirely enclosing said support and projector, a part of said cabinet being movable to open said cabinet and permit said optical system to project horizontally a motion picture from said gate, the direction of said beam being adjustable by angular movement of the support, the optical axis of the vertical beam being coincident with the axis of rotation of the support.

6. In combination, a frame, a support pivotally mounted on said frame on a vertical axis, a motion picture projector carried by said support and including a projection gate, mechanism for advancing film past said gate and an optical system for projecting a beam from said gate to a distant screen, said optical system including elements for defining and directing the beam vertically and elements for directing the beam angularly from a vertical direction, a cabinet enclosing said support and projector, and including a cover wall, at least a part of which is movable to open said cabinet and permit the optical system to project an image from said cabinet, the direction of such projection being adjustable by angular movement of the support.

7. In combination, a frame, a support pivotally mounted on said frame on a vertical axis, a motion picture projector carried by said support and including a projection gate, mechanism for advancing film past said gate and an optical system for projecting a beam from said gate to a distant screen, said optical system including elements for defining and directing the beam vertically and elements for directing the beam angularly from a vertical direction, a cabinet enclosing said support and projector, and including a cover wall, at least a part of which is movable to open said cabinet and permit the optical system to project an image from said cabinet, the direction of such projection being adjustable by angular movement of the support, the optical axis of the vertically directed portion of the beam being coincident with the axis of rotation of the support.

8. In combination, a frame, a support pivotally mounted on said frame on a vertical axis, a motion picture projector carried by said support and including a projection gate, mechanism for advancing film past said gate and an optical system for projecting a beam from said gate to a distant screen, said optical system including elements for defining and directing the beam vertically and elements for directing the beam angularly from a vertical direction, a cabinet enclosing said support and projector, and including a cover wall, at least a part of which is movable to open said cabinet and permit the optical system to project an image from said cabinet, the direction of such projection being adjustable by angular movement of the support, and means for closing the cabinet to the passage of sound waves from said mechanism when the said cover wall is open for the projection of images.

9. In combination, a frame, a support pivotally mounted on said frame on a vertical axis, a motion picture projector carried by said support and including a projection gate, mechanism for advancing film past said gate and an optical system for projecting a beam from said gate to a distant screen, said optical system including elements for defining and directing the beam vertically and elements for directing the beam angularly from a vertical direction, a cabinet enclosing said support and projector, and including a cover wall, at least a part of which is movable to open said cabinet and permit the optical system to project an image from said cabinet, the direction of such projection being adjustable by angular movement of the support, the optical axis of the vertically directed portion of the beam being coincident with the axis of rotation of the support, and means for closing the cabinet to the passage of sound waves from said mechanism when the said cover wall is open for the projection of images.

10. In combination a cabinet having two compartments, a support within one compartment pivotally mounted on a vertical axis, a motion picture projector carried by said support in said compartment and including a gate, film advancing mechanism and an optical system for projecting a beam of light from said gate, a part of the cabinet in the path of the beam being open for the passage of light but closed by light transparent media to the passage of sound from the projector mechanism, the optical system including means for directing the beam horizontally from the cabinet, the direction of the beam being horizontally adjustable by rotation of the turntable whereby an image may be projected in correct alignment in a desired direction, a sound reproducing instrument within the other compartment, a door in the cabinet permitting access to the instrument, the door and instrument being positioned, when in use, out of the path of the projected horizontal beam, whereby when the projector and instrument are simultaneously in use, the sounds of the projector mechanism will be muffled by the first closed compartment and will not interfere with sounds from the instrument and the beam from the projector may be thrown in a selected direction without obstruction due to the use of the instrument.

11. In combination, a cabinet, a support within said cabinet pivotally mounted on a vertical axle, a motion picture projector carried by said support and including a projection gate, mechanism for advancing film past said gate and an optical system for projecting a beam of light from said gate, a part of the cabinet in the path of the beam being open for the passage of light but closed by light transparent media to the passage of sound from the projector, the optical system including means for directing the beam horizontally from the cabinet, the direction of the beam being horizontally adjustable by movement of the turntable whereby an image may be projected in correct alignment in a desired direction, a sound reproducing instrument within the cabinet, a door in the cabinet permitting access to the instrument, the door and instrument being positioned, when the instrument is in use, out of the path of the projected horizontal beam, whereby when the projector and instrument are simultaneously in use, the sounds of the projector mechanism will be confined to the cabinet, and will not interfere with sounds from the instrument and the beam from the projector may be thrown in a selected direction without obstruction due to the use of the instrument.

12. In combination, a cabinet, a motion picture projector within said cabinet having a window, means for positioning an image bearing element for projection from said window, one edge of the window being a base line for the image to be projected, an optical system for projecting a beam horizontally from the cabinet, means for adjusting the horizontal angle of such projected beam whereby it may be directed in a desired direction from the cabinet, and means for insuring that the image of the base line edge will be projected in the same relation to the beam at any angular position thereof, parts of the cabinet being movable to permit the emergence of light from said cabinet and to permit said optical system to throw a horizontal beam in a desired angular direction.

13. In combination, a cabinet including a fixed frame, a motion picture projector within said cabinet having a rectangular window and an optical system for projecting an image from said window, means for positioning an image bearing element for projection from said window, one edge of the window constituting a base line for an image to be projected, said optical system including elements for directing the beam vertically and a mirror for reflecting the beam at an angle to the vertical, the mirror being rotatable on a vertical axis whereby the beam may be directed in a desired direction from the cabinet, and means insuring that light rays from the window will be directed to the mirror at any position thereof in such a relation that the projected image of the base line edge will be at the same relative position at any angular position of the beam, parts of the cabinet being movable to permit the emergence of light from the cabinet and to permit said optical system to throw a beam in a desired angular direction.

14. In combination, a cabinet including a fixed frame, a motion picture projector within said cabinet having a rectangular window and an optical system for projecting an image from said window, means for positioning an image bearing element for projection from said window, one edge of the window constituting a base line for an image to be projected, said optical system including elements for directing the beam vertically and a mirror for reflecting the beam at an angle to the vertical, the mirror being rotatable on a vertical axis whereby the beam may be directed in a desired direction from the cabinet and rotatable means for turning the projected beam from the window whereby the image of the window projected from the cabinet may at any angular position of the beam have the same relative position in the beam.

15. In combination, a cabinet including a fixed frame, a motion picture projector within said cabinet having a rectangular window and an optical system for projecting an image from said window, means for positioning an image bearing element for projection from said window, one edge of the window constituting a base line for an image to be projected, said optical system including elements for directing the beam vertically and a mirror for reflecting the beam at an angle to the vertical, the mirror being rotatable on a vertical axis whereby the beam may be directed in a desired direction from the cabinet, and rotatable means for turning the projected beam from the window whereby the image of the window projected from the cabinet may at any angular position of the beam have the same relative position in the beam. parts of the cabinet being movable to permit the emergence of light from the cabinet and to permit said optical system to throw a beam in a desired angular direction.

Signed at Rochester, New York, this 26th day of August, 1927.

ADOLPH STUBER.